United States Patent [19]

Weber et al.

[11] Patent Number: 4,490,025
[45] Date of Patent: Dec. 25, 1984

[54] SPECIMEN HOLDER FOR MICROSCOPES

[75] Inventors: Klaus Weber, Konigsbronn; Siegfried Gerber, Oberkochen; Horst Fischer, Aalen, all of Fed. Rep. of Germany

[73] Assignee: Carl-Zeiss-Stiftung, Heidenheim, Oberkochen, Fed. Rep. of Germany

[21] Appl. No.: 421,889

[22] Filed: Sep. 23, 1982

[30] Foreign Application Priority Data

Sep. 29, 1981 [DE] Fed. Rep. of Germany ....... 3138654

[51] Int. Cl.$^3$ .............................................. G02B 21/24
[52] U.S. Cl. ................................................. 350/529
[58] Field of Search ......................................... 350/529

[56] References Cited

FOREIGN PATENT DOCUMENTS 2218156 12/1972 Fed. Rep. of Germany ...... 350/529
2946544  5/1981 Fed. Rep. of Germany ...... 350/529
0021752  2/1979 Japan .................................. 350/529

Primary Examiner—John K. Corbin
Assistant Examiner—Lynn Vandenburgh Kent
Attorney, Agent, or Firm—Hopgood, Calimafde, Kalil, Blaustein & Judlowe

[57] ABSTRACT

Two embodiments of a holder for standard specimen slides are disclosed which permit the use of only one hand when changing specimens and are characterized by simplicity in construction.

In the first embodiment, the holder has a spring band (7) which is bent convexly towards the specimen slide (5) and clamps the slide against front-edge stops (2, 3, 4).

In the second embodiment, the holder has a resiliently supported turnable disc (20) against the outer circumference of which the narrow side of the specimen slide (15) strikes tangentially upon the insertion. The disc (20) clamps the specimen slide (15) against the front-edge stop (12, 13, 14) after passing by it.

5 Claims, 3 Drawing Figures

SPECIMEN HOLDER FOR MICROSCOPES

BACKGROUND OF THE INVENTION

The present invention relates to a specimen holder for microscopes in which a generally rectangular specimen slide is clamped with its front side held by spring force against fixed stops. Specimen holders of the indicated type, in use to the present time, comprise a crescent-shaped resilient lever which is pivotally mounted to the table of the microscope, at a corner of the specimen slide; the lever is movable over a surface of the slide and presses the opposite surface of the slide against fixed stops on the specimen holder. Such specimen holders are illustratively described in West German published aplication (Offenlegungsschrift) No. 2,218,156 and in West German petty patent (Gebrauchsmuster) No. 3,103,057.

Such simple specimen holders can also securely hold objects of different dimensions, but they have the disadvantage that the user must retract the lever with one hand when changing specimens, while his other hand manipulates the specimen slide. The fact that both hands must be used when changing the specimen constitutes a disadvantage for the user, particularly in work which requires frequent change of specimen slides. Since standardized specimen slides are generally used, the aforementioned advantage of the known specimen holder, namely, the possibility of holding objects of different dimensions, cannot always be utilized.

West German published application (Offenlegungsschrift) No. 2,946,544 (FIG. 3), describes a specimen holer for standard objects which permits one-hand operation when changing objects. It consists of a drawer-shaped receiver which, upon insertion, presses an inserted specimen slide against a lower edge of the specimen holder. This specimen holder necessarily conceals edge regions of the surface of the specimen slide.

BRIEF STATEMENT OF THE INVENTION

The object of the present invention is to provide a specimen holder of simple construction for standard specimen slides, of such nature as to leave the entire surface of the specimen slide free, thus permitting specimens to be changed in a one-hand operation.

The invention achieves this object in a specimen holder having fixed stops to locate edges of a specimen slide, by providing a laterally yieldable resilient-action member for edge engagement with an inserted specimen slide. The resilient-action member is displaced against its spring force, both in the course of slide insertion and in the course of slide removal, and the resilient-action member resiliently loads its contact with the edge of the inserted slide, to hold the slide against the fixed stops.

Specimen holders of the invention combine the above advantages which have been formulated as objects and are therefore particularly suitable for use in routine examinations.

In one advantageous embodiment, a spring disc is spring-urged for specimen-slide edge engagement, and it is preferably mounted for rotation and for laterally guided displacement, as permitted by a guide slot. In this way, friction is reduced upon the introduction of the specimen slide and it is thus possible to avoid jamming of sharp-edged specimen slides.

The resilient holding force of the disc can be easily applied by a wire spring, applied tangentially to the outer circumference of the disc or to its pivot pin.

DETAILED DESCRIPTION

Two embodiments of the invention will be described in detail with reference to FIGS. 1 and 2 of the accompanying drawings, in which.

Figure 1:
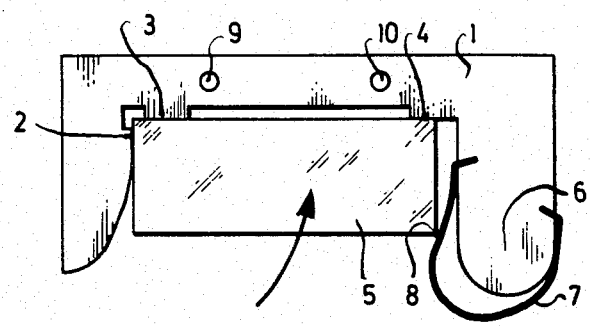
FIG. 1 is a simplified plan view to show a first embodiment.

In FIG. 1, the first embodiment of a specimen holder of the invention is seen to comprise a U-shaped plate 1 which has three stop points 2, 3, 4 for locating the transparent specimen slide 5. The plate 1 has two holes 9 and 10 which serve for attaching the specimen holder to the table of the microscope.

A spring band 7 is positioned around an arm 6 of plate 1, and the two ends of band 7 are so anchored to arm 6, in reference to the specimen slide, as to produce a laterally compressible space between the spring band 7 and the inner side of the arm 6. The spring band 7 and plate 1 have approximately the same height as the thickness of the specimen slide 5.

Upon introduction of the specimen slide 5, its edge 8 slides along the spring band 7, pushes the latter to the side and, after overcoming a pressure point resulting from the spring-band and specimen geometry, is clamped by the spring band against the stops 2 to 4.

Figure 1A:
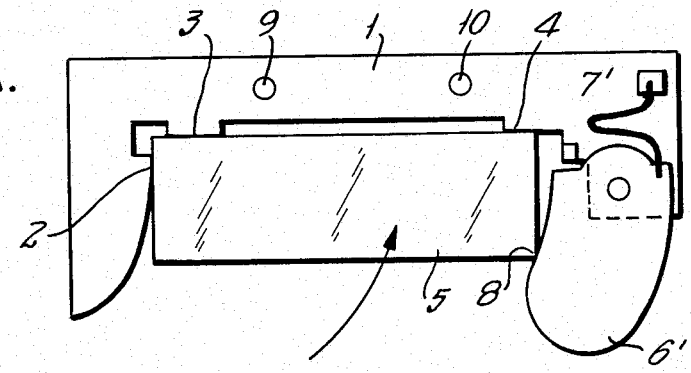
FIG. 1A is a similar view, for a modification.

The modification of FIG. 1A illustrates that the specimen holder can be modified such that arm 6' is a separate part having the shape of the surface surrounded by the spring band 7 and is bodily and resiliently swingable about a swivel bearing in plate 1. A stop 1' must then be provided in order to limit the resiliently urged swing of the arm, care being taken that specimen slides inserted into the thus-modified holder contact part 6' substantially tangentially and in a convexly shaped contact region, and then push it aside against spring force.

Figure 2:
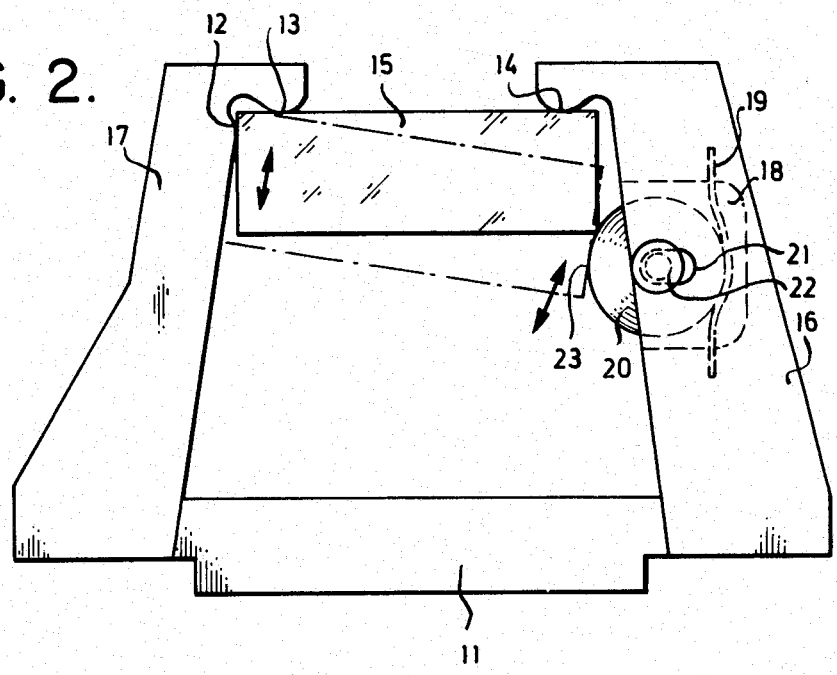
FIG. 2 is a similar view showing another embodiment.

The specimen holder in accordance with the alternative embodiment of FIG. 2 has a base plate 11 carrying two opposed strips 16, 17 the ends of which are developed as stop 12 for the left-end edge and as stops 13, 14 for the front edge of the specimen slide 15. The area enclosed by strips 16, 17 converges in the direction of slide introduction. The specimen holder is fastened via base plate 11 to the table of a microscope.

A disc 20 is retained in a recess 18 in strip 16, the recess being open on the side facing strip 17. Disc 20 carries a central pin 22 which is guided in a laterally extending slot in strip 16. A spring wire 19 urges disc 20 in the direction towards the strip 17.

In the course of manipulated feeding of a specimen slide 15 into the holder of FIG. 2, the left-end edge of slide 15 is guided along the inner edge of strip 17 (in the orientation suggested by phantom outline); the opposite end edge 23 of slide 15 contacts disc 20 and, in the course of swinging slide 15 about stop 13 (as a fulcrum), disc 20 is displaced laterally against spring action. In this connection, disc 20 rolls along edge 23 of slide 15. After passing a perceptable pressure point, disc 20 clamps the specimen slide 15 against the stop 14.

What is claimed is:

1. In a specimen holder for use in a microscope, wherein an open frame includes two longitudinally spaced fixed stops for abutment by one long edge of a rectangular specimen slide and a fixed end stop for one of the ends of the specimen slide and a spring-loaded holding element carried by the frame and biased for engagement with the other end of the specimen slide, the improvement in which the holding element is a disc supported by said frame for rotation about its axis, said frame including guide means determining a limited extent of disc displacement in the direction of engagement with the other end of the specimen slide, and spring means reacting between said disc and frame and urging said disc in the general direction toward said fixed end stop.

2. The improvement of claim 1, in which the inner edge of the frame in approach to said end stop is straight but obtusely inclined with respect to the alignment of said longitudinally spaced fixed stops, said disc in its fully extended spring-urged position being poised for substantially tangential engagement with the said other end of the specimen slide as the said one end is caused to slide along said straight edge in the direction of approach to said fixed stops.

3. The improvement of claim 2, in which, when the specimen slide is in contact with all three fixed stops, said disc engages only the specimen-slide corner which is diagonally opposite the corner between said fixed end stop and the adjacent one of said longitudinally spaced stops.

4. The improvement of claim 1, in which said disc includes a pivot pin and in which said guide means is a slot for guidance of said pin.

5. The improvement of claim 1, in which said spring means is a wire spring having tangential engagement to said disc.

* * * * *